(12) United States Patent
Busch

(10) Patent No.: US 7,088,095 B1
(45) Date of Patent: Aug. 8, 2006

(54) BALANCED MAGNETIC LINEAR DISPLACEMENT SENSOR

(75) Inventor: Nicholas F. Busch, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/772,171

(22) Filed: Feb. 4, 2004

(51) Int. Cl.
*G01B 7/00* (2006.01)
*G01B 7/02* (2006.01)

(52) U.S. Cl. .............. 324/207.2; 324/207.24; 324/207.26

(58) Field of Classification Search ............ 324/207.11, 324/207.13, 207.2–207.25, 207.26, 173–174, 324/244, 251, 260–262; 123/406.52, 406.58, 123/617
See application file for complete search history.

(56) References Cited

U.S. PATENT DOCUMENTS

| | | | |
|---|---|---|---|
| 4,088,977 A | 5/1978 | Bowman, Jr. et al. .... | 338/32 R |
| 4,121,185 A | 10/1978 | Genz .......................... | 336/110 |
| 5,074,053 A | 12/1991 | West ........................... | 33/708 |
| 5,565,770 A | 10/1996 | Jones ..................... | 324/207.24 |
| 6,057,682 A | 5/2000 | McCurley et al. ..... | 324/207.23 |
| 6,215,299 B1 | 4/2001 | Reynolds et al. ........ | 324/207.2 |
| 6,304,078 B1 | 10/2001 | Jarrard et al. ............. | 324/207.2 |
| 6,411,081 B1 | 6/2002 | Spellman ................ | 324/207.21 |
| 6,496,003 B1 | 12/2002 | Okumura et al. ...... | 324/207.24 |
| 6,577,123 B1 | 6/2003 | Schroeder et al. ..... | 324/207.24 |
| 6,593,734 B1 * | 7/2003 | Gandel et al. ......... | 324/207.25 |
| 2003/0122641 A1 | 7/2003 | Luetzow ..................... | 335/205 |

OTHER PUBLICATIONS

PCT Notification of Transmittal of the International Search Report and the Written Opinion of the International Searching Authority, Date of Mailing: Jul. 1, 2005.

* cited by examiner

*Primary Examiner*—Bot LeDynh
(74) *Attorney, Agent, or Firm*—Kermit D. Lopez; Luis M. Ortiz

(57) ABSTRACT

A magnetic linear displacement sensor. In accordance with one embodiment, the displacement sensor includes a Hall transducer element having a sensor plate surface and at least one magnet having a lengthwise dimension along which said Hall element detects a magnetic field component orthogonal to the sensor plate surface during displacement sensing. The magnet includes first and second pole faces disposed on opposite lengthwise sides thereof and a polarization axis aligned orthogonally with respect to the lengthwise dimension. The first pole face opposes the Hall, element and is characterized as having a non-planar surface contoured to generate a substantially linear orthogonal magnetic field component sensed by said Hall element during linear displacement sensing.

12 Claims, 5 Drawing Sheets

BALANCED MAGNETIC LINEAR DISPLACEMENT SENSOR

TECHNICAL FIELD

Embodiments are generally related to a magnetic sensor for detecting and tracking the relative position of a target object. The embodiments are also related to a magnetic sensor configured to provide a linear magneto-electric response while optimally compensating for sensor alignment placement tolerances.

BACKGROUND OF THE INVENTION

Magnetic sensing devices have many detection applications, including navigation, current sensing, and linear and angular position and displacement sensing. Magnetic sensors provide a non-contacting means for determining position related parameters such as shaft rotation, presence of magnetic ink, vehicle heading, etc. One of the benefits of using magnetic sensors is that the output of the sensor is generated without the use of contacts. This is a benefit because over time contacts can degrade and cause system failures.

A Hall sensor is a common magnetic sensor type having many applications including detection of the linear displacement of a target object. FIG. 1A illustrates a conventional implementation of a Hall effect linear displacement sensor 10 utilized for sensing displacement of a desired target object. Displacement sensor 10 generally comprises a Hall transducer element 2 positioned with respect to a permanent magnet 4.

In accordance with known Hall effect sensor operating principles, Hall element 2 is a magneto-electric transducer that converts a portion of the magnetic energy from permanent magnet 4 into a voltage signal that is detected and utilized such as by an automotive feedback control system. Specifically, Hall element 2 comprises a plate that is oriented in parallel with the depicted x-y plane and positioned with respect to magnet 4 such that its flat sensing surface is disposed in parallel opposition to a lengthwise surface 6 of rectangular bar-shaped magnet 4. Although not expressly depicted in FIG. 1A, it will be appreciated by those skilled in the art that in practical application, magnet 4 and Hall element 2 are coupled to mounting sites within a given system such that magnet 4 and/or Hall element 2 are linearly movable along the depicted Hall position direction with respect to the other.

As shown in FIG. 1A, Hall element 2 is generally positioned at a distance z=1.75 mm from the opposing lengthwise surface 6 of magnet 4, having a length in the y-direction of L=18.0 mm, a height in the z-direction of H=5.75 mm, and a width in the x-direction of 5.0 mm. The Hall position in the y-direction can be, for example, a 15 mm linear segment between specified endpoints, $y_1$ and $y_2$, which are symmetrically offset from the polarized ends of magnet 4 by approximately d=1.5 mm.

Being a linear displacement detection device, sensor 10 is designed such that a relative linear motion along the upper surface 6 of magnet 4 and Hall element 2 in the y-direction between $y_1$ and $y_2$ is determined and tracked in real time by Hall element 2, which detects the magnitude and polarity of the z-component, $B_z$, of the magnetic field produced by magnet 4. The magnitude and polarity of the orthogonal z-component component of the magnetic field detected by Hall element 2 vary in accordance with the intensity and angle of the magnetic field along the linear path of travel of Hall element 2 with respect to the length of magnet 4 between specified sensing positions.

FIG. 1B illustrates a graph depicting the varying field strength of the sensed orthogonal component, $B_z$, of the magnetic field as magnet 4 moves linearly in the y-direction with respect to Hall element 2. As shown in FIG. 1B, the $B_z$ field component varies in a non-linear manner as Hall element 2 traverses a linear path parallel to the upper surface 6 of magnet 4, pitching steeply as Hall element 2 nears each of the opposing pole face ends and flattening at the magnet midpoint where $B_z$ is substantially zero. The voltage output response from Hall sensor 2 is proportional to the observed $B_z$ component and is therefore similarly non-linear.

The non-linear transducer response from Hall element 2 is detrimental in practice, resulting in reduced detected sensor output linearity and increased additional signal processing overhead required to linearize the detected output. This non-linearity in sensor response is particularly problematic in terms of loss of tracking accuracy at the flattened signal region.

The non-linear Hall sensor output problem is addressed by U.S. Pat. No. 6,496,003, issued to Okumura et al., which discloses a magnet shaping technique in which the magnet surface opposing the Hall element and bounded at each end by respective pole faces is arched in a manner such that the orthogonal magnetic field component varies linearly as the magnet moves linearly with respect to the Hall element. This magnet shaping technique results in secondary N—S pole pairs along the arched surface that linearize the sensed magnetic field component and thus the sensor output response. While effective for linearizing the Hall sensor output, the Okumura device is highly susceptible to linear output error resulting from variations in lateral placement of the Hall element with respect to the magnet.

In view of the foregoing, a need remains for a magnetic linear displacement sensor having a substantially linear output response while minimizing linear output error caused by variations in the construction and positioning of magnetic sensor components. The present invention addresses such a need.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

A magnetic linear displacement sensor is disclosed herein. In accordance with one embodiment, the displacement sensor includes a Hall transducer element having a sensor plate surface and further includes at least one magnet having a lengthwise dimension along which the Hall element detects a magnetic field component orthogonal to the sensor plate surface during displacement sensing. The magnet includes first and second pole faces disposed on opposite lengthwise sides thereof and a resultant polarization axis aligned orthogonally with respect to the lengthwise dimension. The first pole face is characterized as having a non-planar surface contoured to generate a substantially linear orthogonal magnetic field component sensed by said Hall element during linear displacement sensing. The Hall element is positioned with respect to the magnet such that during linear displacement sensing it traverses a linear path in parallel opposition to the lengthwise side serving as the first pole face.

All objects, features, and advantages of the present invention will become apparent in the following detailed written description.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

The present invention is described in a preferred embodiment in the following description with reference to the figures. While this invention is described in terms of the best mode for achieving this invention's objectives, it will be appreciated by those skilled in the art that variations may be accomplished in view of these teachings without deviating from the spirit or scope of the present invention.

The present invention is directed to a magnetic linear displacement sensor device and system incorporating the same that provide a substantially linear Hall response output while minimizing output response errors caused by manufacturing and assembly tolerances and variations. More specifically, and as explained in further detail with reference to the figures, the present invention employs a Hall-type transducer element in combination with one or more magnets having contouring and polarization characteristics enabling the Hall element to detect a substantially linear orthogonal magnetic field component as it traverses in proximity to the magnet(s) in a linear manner. It should be noted that as utilized herein, "linear displacement sensor" refers to the characteristics of the Hall sensor device in detecting a linear motion between a Hall element and one or more magnets and should not be construed as excluding systems that may include angular conversion means for translating an angular or rotating target motion into a linear motion at the sensor.

Figure 1A:
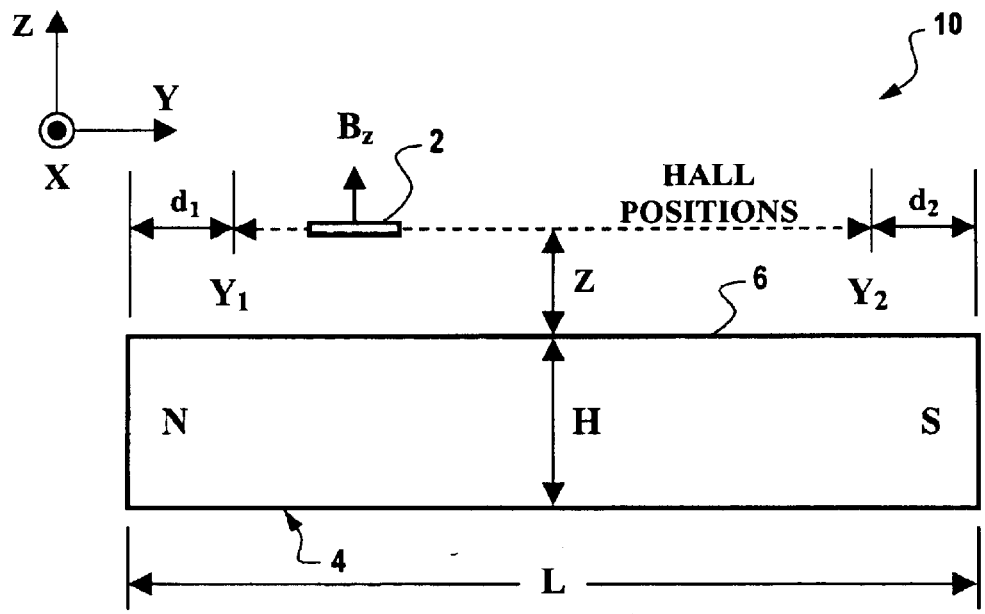
FIG. 1A illustrates a prior art magnetic linear displacement sensor.
Figure 1B:
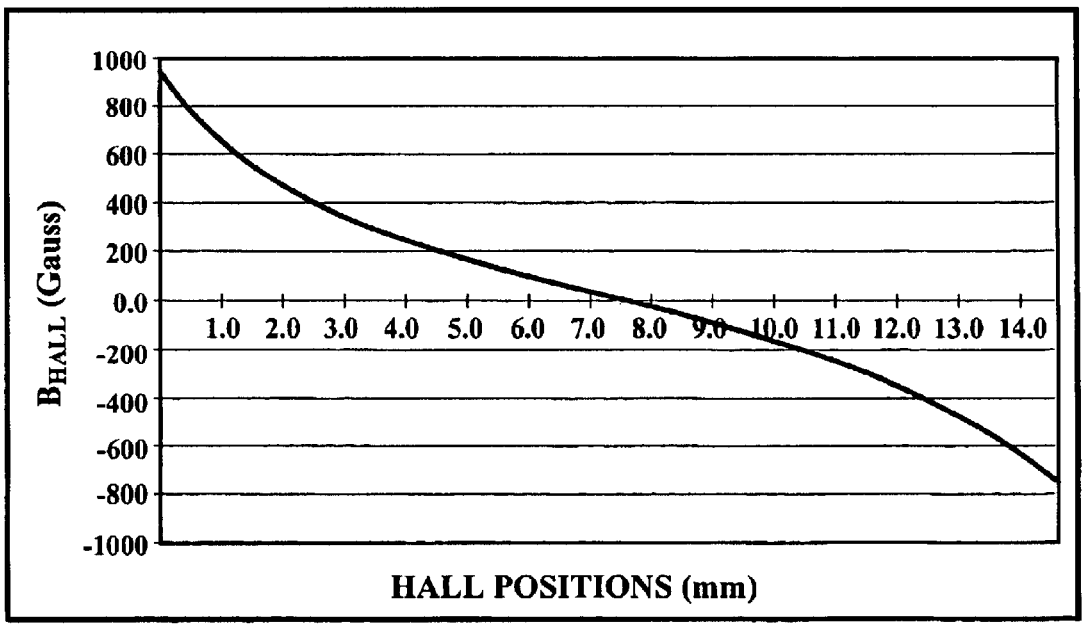
FIG. 1B depicts the orthogonal magnetic field component sensed by the displacement sensor of FIG. 1A.
Figures 2A, 2B:
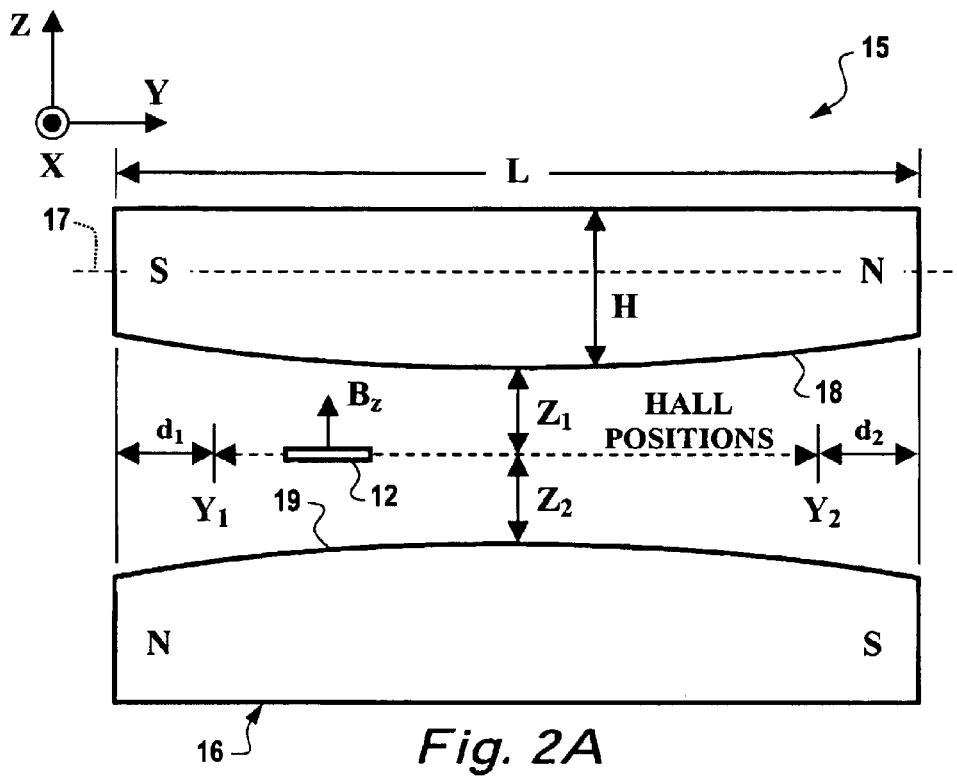
FIG. 2A illustrates a magnetic linear displacement sensor in accordance with one embodiment of the present invention.
FIG. 2B depicts the orthogonal magnetic field component sensed by the linear displacement sensor of FIG. 2A.
Figure 5A:
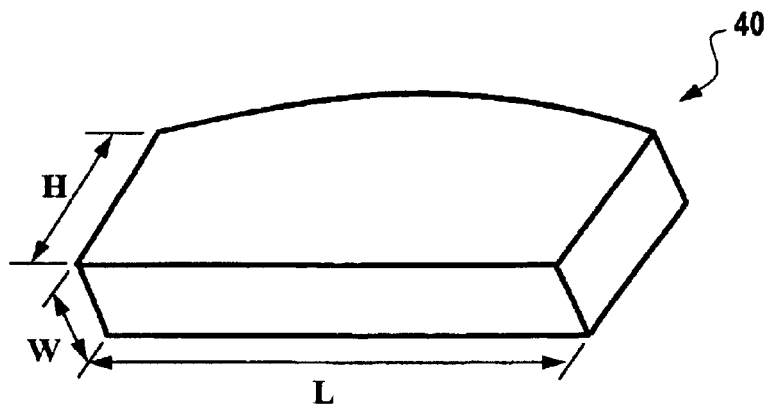
FIG. 5A illustrates a perspective view of an exemplary permanent magnet employed within a magnetic linear displacement sensor in accordance with a preferred embodiment of the present invention.
Figure 5B:
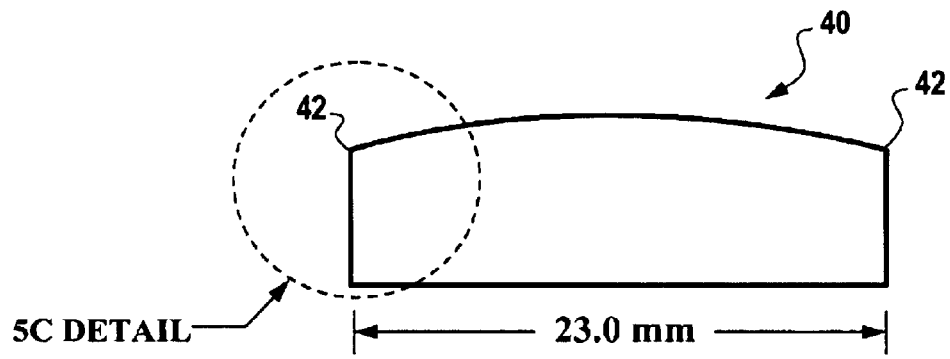
FIG. 5B depicts a profile view of the permanent magnet illustrated in FIG. 5A showing the side profile contouring of a pole face in accordance with the present invention.
Figure 5C:
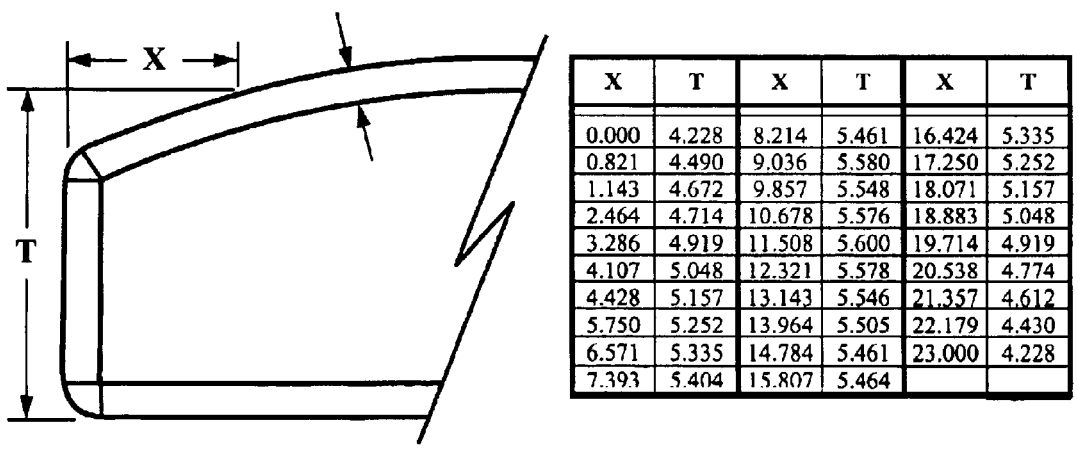
FIG. 5C illustrates a parametric detail view of the pole face contouring of the permanent magnet depicted in FIGS. 5A and 5B.

With reference now to the figures wherein like reference numerals refer to like and corresponding parts throughout, and in particular with reference to FIG. 2A, there is illustrated a magnetic linear displacement sensor 15 in accordance with one embodiment of the present invention. In accordance with the depicted embodiment, magnetic linear displacement sensor 15 generally operates in accordance with Hall effect sensor principles and includes an opposing pair of magnets 14 and 16 that are each typically affixed to a linearly moving mounting site (not depicted). Magnets 14 and 16 are preferably rare earth devices such as neodymium iron boron (NeFeB) magnets having a magnetic residual induction value of Br=10000 gauss and a relative magnetic permeability of 1. Preferred dimensions and contouring for magnets 14 and 16 are illustrated in FIGS. 5A–5C.

Displacement sensor 15 further comprises a Hall transducer element 12, shown with its sensor plate in side profile view and positioned with respect to the magnets such that a specified magnetic field component orthogonal to the surface of the Hall element sensor plate surface is detected during linear displacement sensing. As explained below, magnetic linear displacement sensor 15 improves upon the prior art with a complementary magnet design that provides a linear output response that is resistant to output response errors caused positioning variances in the depicted z-direction between the Hall element and the magnet surface.

As shown in the depicted embodiment, first and second magnets 14 and 16 are polarized such that the respective north-south pole faces are disposed at the lengthwise ends of each of the magnets, resulting in a magnetic polarization axis parallel to the linear Hall position sensing path. Furthermore, magnets 14 and 16 are positioned in mutual lengthwise opposition resulting in cross-wise opposing magnetization. In the depicted embodiment, Hall element 12 moves linearly with respect to the magnets in the depicted y-direction and is limited to a range of 15 mm between specified points $y_1$ and $y_2$ that are each offset from the polarized ends of magnets 14 and 16 by a distance d=4.0 mm.

To obtain a linear output response between $y_1$ and $y_2$, the inwardly facing lengthwise surface 18 of first magnet 14 is contoured in a cambered or convex arched manner such that over the range of linear travel along the depicted Hall position line, the orthogonal magnetic field component, $B_z$, generated by magnet 14 varies in a linear manner as detected by Hall element 12. Such contouring of a lengthwise side of a magnet polarized at each end is known in the art, such as is disclosed by U.S. Pat. No. 6,496,003, issued to Okumura et al. Okumura discloses a Hall-type sensor employing magnet shaping to effectuate a linear response. However, the prior art does not address a significant source of sensor output error caused by imprecise positioning of the Hall element with respect to the magnet.

Magnetic linear displacement sensor 15 improves upon the prior art with a design that reduces or eliminates sensor output error caused by imprecise positioning of the magnets in the depicted z-direction with respect to Hall element 12. Specifically, and as shown in FIG. 2A, a second magnet 16 is disposed in mutual lengthwise opposition to first magnet 14 to form a symmetrically bounded sensing corridor within which Hall element 12 is movably positioned along the indicated y-direction Hall position line of travel. The sensing corridor is bounded by the contoured surfaces 18 and 19 of magnets 14 and 16, respectively, at varying z-direction distances $z_1$ and $z_2$ as Hall element 12 moves with respect to surfaces 18 and 19 along the Hall position line from $y_1$ to $y_2$. Each of magnets 14 and 16 contributes magnetic field lines traversing the length of the sensing corridor formed between the magnets.

Oriented within the sensing corridor such that its plate surface is parallel with the illustrated x-y plane, Hall element 12 senses the relative strength and direction (i.e. polarity) of the z-component of each of the magnetic fields generated by magnets 14 and 16. Since the field strength is proportional to the distance between Hall element 12 and the magnets 14 and 16, a manufacturing placement error in the z-direction that causes the field strength contribution of one of the magnets to be reduced is balanced by a greater field contribution of the other magnet, resulting in a stable detected field strength along each of the points of the linear sensing path even with variation in z-position between the magnets and the Hall element.

FIG. 2B depicts the combined orthogonal field strength component, $B_z$, of the magnetic fields as sensed by the magnetic linear displacement sensor 15 along the 15 mm Hall sensing path between $y_1$ and $y_2$. As shown in FIG. 2B, the sensed $B_z$ is a substantially linear signal varying from approximately 646 gauss at $y_1$ to −646 gauss at $y_2$. The sensed signal shown in FIG. 2B is generated assuming, for each of magnets 14 and 16, a magnetic residual induction value of $B_r$=10000 gauss, a relative permeability of 1, a length L=23.0 mm, an x-direction width of 4.0 mm, and a height varying from H=4.23 mm at each end and sloping in an upward convex manner to a peak of 5.6 mm. The depicted signal further assumes substantially symmetric z-direction distances, $z_1$ and $Z_2$, between Hall element 12 and magnets 14 and 16, respectively, that vary from a minimum of 3.4 mm at the center point of the sensing corridor to a maximum of 4.0 mm at each of Hall position endpoints $y_1$ and $y_2$.

Figure 3A:
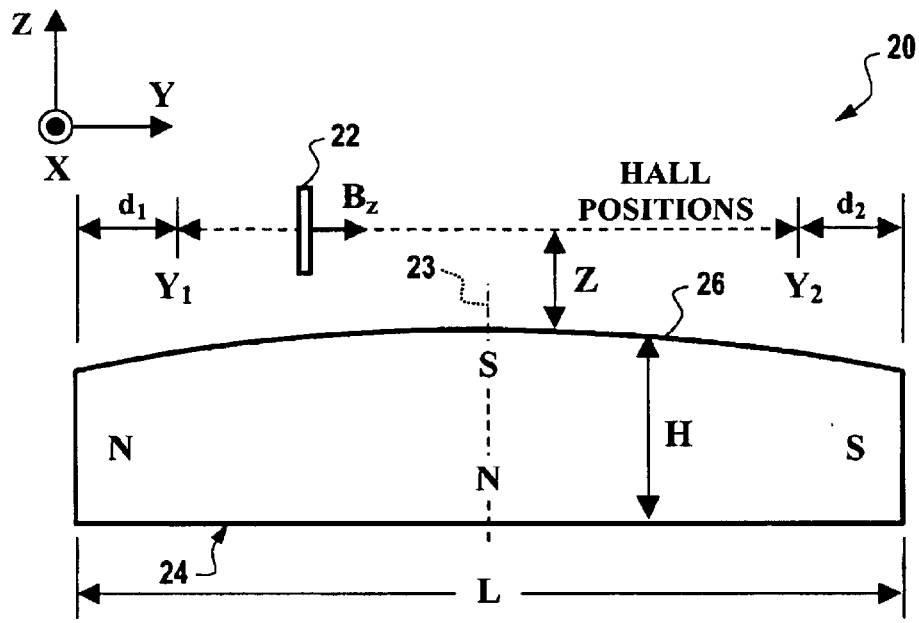
FIG. 3A illustrates a magnetic linear displacement sensor in accordance with an alternate embodiment of the present invention.
Figure 4A:
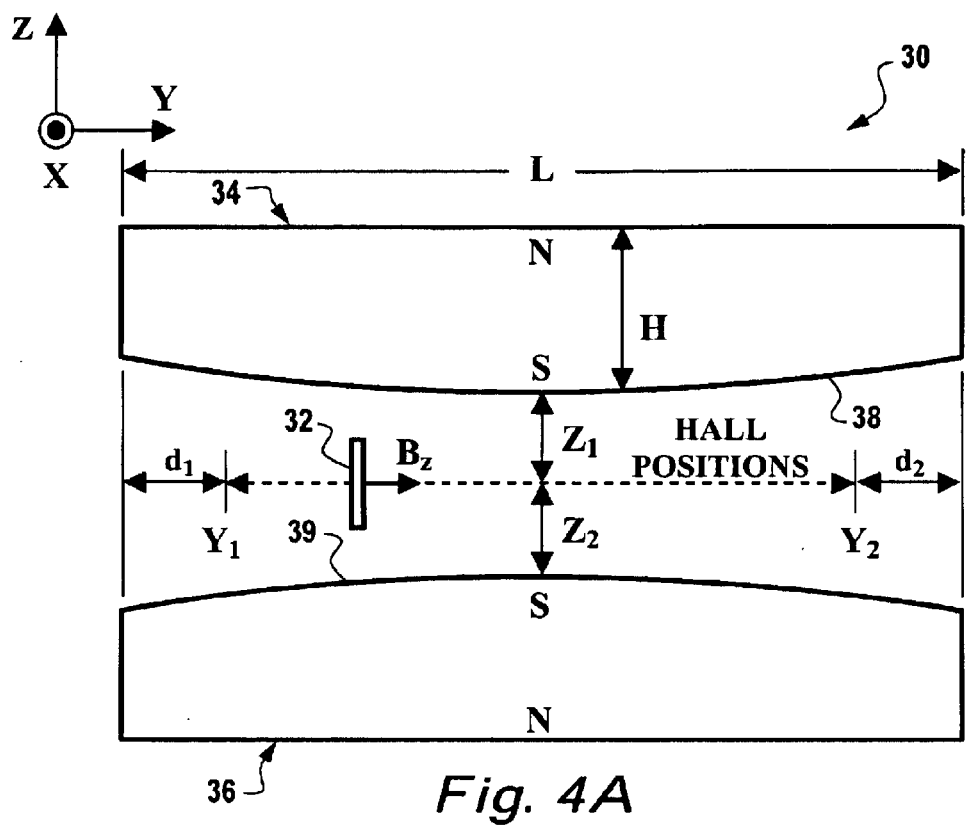
FIG. 4A illustrates a magnetic linear displacement sensor in accordance with a preferred embodiment of the invention.

As explained above, the dual magnet design of linear displacement sensor 15 minimizes linear output error resulting from offset in the placement of the magnets with respect to the Hall element in the depicted z-direction. However, it has been found that the foregoing embodiment does not adequately address response output errors resulting from other manufacturing and assembly variations, such as those affecting magnet rotation and magnetization alignment. FIGS. 3A and 4A illustrate alternate embodiments which address this problem by using a different sensor configuration that produces a magnetic field profile substantially more resistant to response errors caused by magnet or magnetization misalignment.

Referring first to FIG. 3A, there is illustrated a magnetic linear displacement sensor 20 employing an improved magnet configuration that minimizes linear output error for low error tolerance applications. As with displacement sensor 15, linear displacement sensor 20 employs Hall effect sensor principles to sense a relative linear traversal between one or more magnets and Hall transducer means. As shown in FIG. 3A, linear displacement sensor 20 generally includes a Hall element 22 having a sensor plate surface aligned in parallel with the depicted x-z plane. In this manner, Hall element 22 is positioned with respect to a permanent magnet 24 such that the orthogonal y-component of the magnetic field, $B_y$, is detected as Hall element 22 moves relative to magnet 24 along the depicted Hall position line from $y_1$ to $y_2$. Similar to the sensor configuration depicted in FIG. 2A, magnet 24 has a contoured lengthwise side 26 facing Hall element 22 to effectuate a linear variation in $B_y$ along the linear sensing path.

In contrast to the embodiment depicted in FIG. 2A, magnet 24 includes first and second magnetic faces disposed on opposite lengthwise sides of the magnet. In this manner, the magnetic polarization axis 23 of magnet 24 is aligned orthogonally with respect to the lengthwise dimension and the Hall sensing path with one of the two pole faces (the south in the depicted embodiment) forming the lengthwise side facing Hall element 22. The resulting magnetic field profile along the linear sensing path is substantially less susceptible to linearity variations caused by misalignment of the placement or magnetic alignment of magnet 24. With magnet 24 positioned and polarized as shown in FIG. 3A, the sensed $B_y$ component of the magnetic field varies in a substantially linear manner over the sensing path as depicted in FIG. 3B.

Figure 3B:
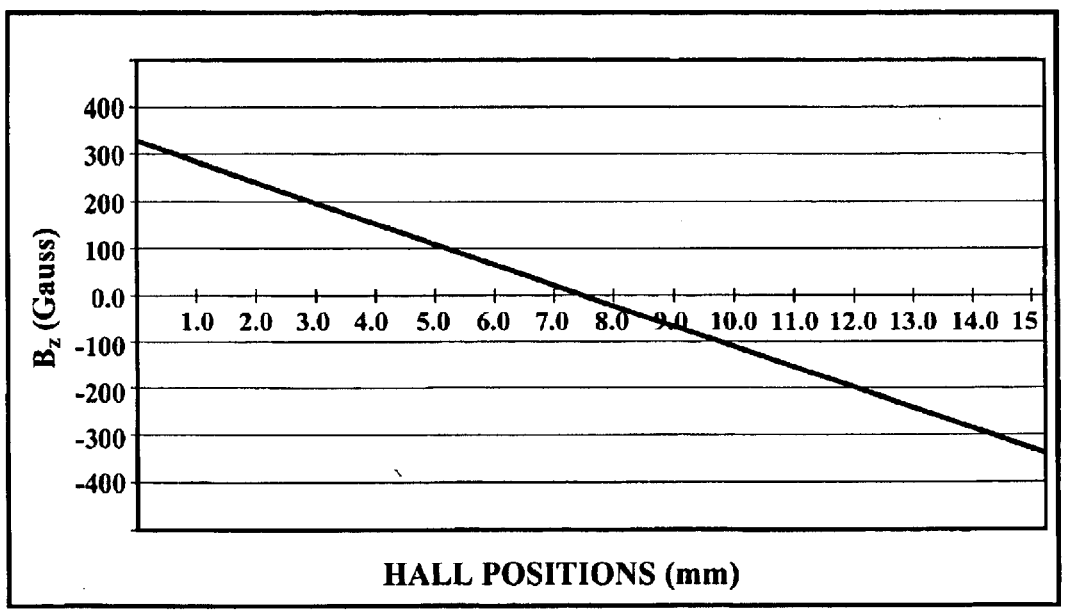
FIG. 3B depicts the orthogonal magnetic field component sensed by the linear displacement sensor of FIG. 3A.

More specifically, and referring to FIG. 3A in conjunction with FIG. 3B, given dimensions of magnet 24 having a length, L=23.0 mm, a width (not depicted in FIG. 3A) of 4.0 mm, and a height H varying in a symmetrically convex sloping manner from 4.23 mm at the ends to 5.60 mm at the center, the sensed magnetic field component varies linearly from 323 gauss to −323 gauss along the linear displacement sensing path from $y_1$=0 mm to $y_2$=15.0 mm, with an offset d=4.0 mm. A typical manufacturing tolerance for the magnetization direction is within 5 degrees of nominal. The inventor has discovered that the magnetic field profile resulting from linear position sensor 20 is superior to that of a sensor having a similarly contoured lengthwise face and in which the polarization axis of the magnet is parallel to the Hall path, such as is disclosed by Okumura, in terms of being less sensitive to the linearity error that results from magnetization direction errors. A 5 degree magnetization direction error causes substantially less linearity error in sensor 20 and in such prior art sensors.

The response of displacement sensor 20 is now compared with the response of a sensor with a similarly contoured surface but having a polarization axis parallel to the lengthwise Hall position path, such as that disclosed by Okumura. Aside from misalignment in the z-direction, the Okumura sensor is most sensitive to magnetic polarization direction error, having an additional linearity error of approximately 2.6% resulting from a magnetization misalignment of 5 degrees.

Assuming a baseline error of approximately 0.6%, this leaves the Okumura sensor with a maximum error for a single contributing factor of 3.2%. In contrast, sensor 20 is most sensitive to magnet rotation, having a 1.1% linearity error for a magnet rotated 5 degrees from ideal. Again assuming a baseline error of 0.6%, this leaves sensor 20 with a maximum error for a single contributing factor of 1.9%. Anticipating the expected variations in component construction and placement, sensor 20 thus has approximately 1.3% less output linearity error than the prior art contoured sensor in which the polarization axis is parallel with the Hall direction path.

While magnetic linear displacement sensor 20 demonstrates superior linear response characteristics in terms of reduced susceptibility to linear output errors due to manufacturing positioning tolerances in the position and magnetization alignment of magnet 24, an offset in the Hall element position in the depicted z-direction with respect to magnet 24 may nevertheless result in an unacceptable sensor output error for low error tolerance applications.

This problem is addressed by the preferred embodiment of the present invention illustrated in FIG. 4A. Specifically, FIG. 4A depicts a magnetic linear displacement sensor 30 comprising a first magnet 36 positioned and polarized with respect to a Hall element 32 in the same manner as depicted in FIG. 3A. Similar to the contouring and magnetization of magnet 24 in sensor 20, the opposing magnets 34 and 36 are polarized such that the contoured inner surfaces 38 and 39 are pole faces, resulting in a magnetization axis orthogonal to the linear sensor path. Having a similar magnetic field profile as sensor 20, displacement sensor 30 demonstrates a similarly reduced susceptibility to linear output error resulting from manufacturing and assembly tolerances relating to magnet rotation and magnetization alignment of the sensor magnets.

In addition, and in an important feature of the depicted embodiment, a second magnet 34 provides a field balancing function analogous to the balancing function provided by the magnet pair depicted in FIG. 2A such that the linear output error caused by positioning errors of the Hall element in the z-direction is minimized.

Figure 4B:
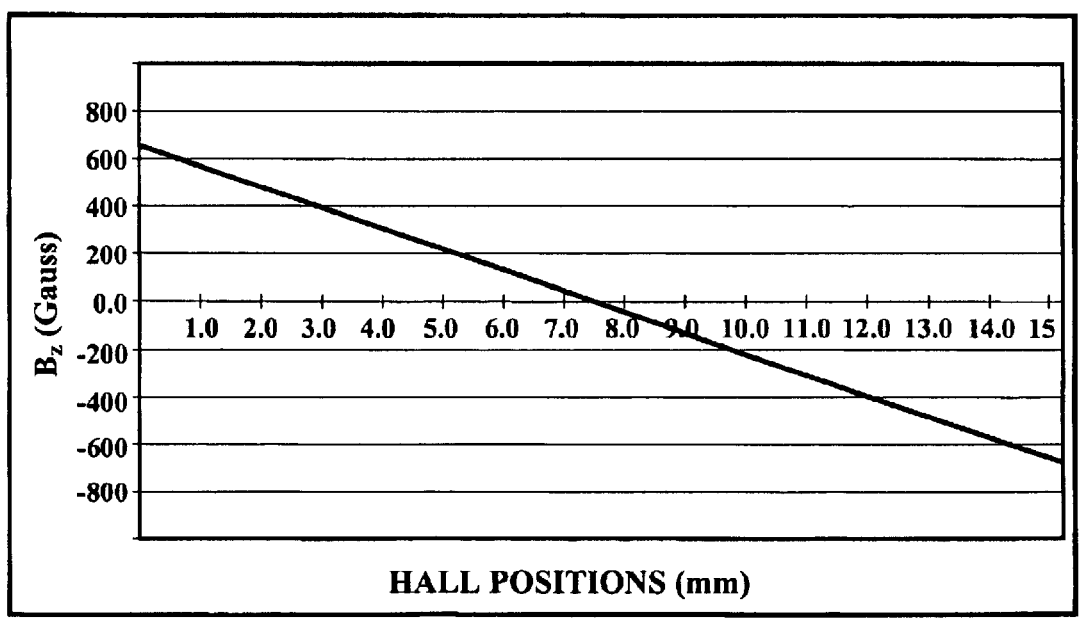
FIG. 4B depicts the orthogonal magnetic field component sensed by the linear displacement sensor of FIG. 4A.

The sensor response of magnetic linear displacement sensor 30 is illustrated in FIG. 4B, which depicts a relative linear response of the magnetic field from 646 Gauss at $y_1$ to −646 Gauss at $y_2$. For the response depicted in FIG. 4B, the same magnet dimensions and characteristics are assumed as those set forth in FIG. 3B.

FIGS. 5A–5C illustrate a preferred relative sizing and contouring of a permanent magnet that may be advantageously utilized with the linear displacement sensor embodiments disclosed herein. Specifically, and referring to FIGS. 5A and 5B there are shown perspective and profile views of a permanent magnet 40 having a uniform length, L, of approximately 23.0 mm, a uniform width, W, of approximately 4.0 mm, and a height, H, that varies in a curved manner such that the resultant contoured surface is characterized as generally sloping in a convex manner upwardly from each of the lateral edges 42 having an end height of 4.228 mm and peaking at approximately the midpoint of the lengthwise dimension at a height of 5.60 mm. FIG. 5C illustrates a parametric detail view of the pole face contouring of the permanent magnet depicted in FIGS. 5A and 5B in accordance with a preferred embodiment of the present invention.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

Having thus described the invention what is claimed is:

1. A magnetic linear displacement sensor comprising:
    a Hall element having a sensor plate surface; and
    at least one magnet having a lengthwise dimension along which said Hall element detects a magnetic field component orthogonal to the sensor plate surface during displacement sensing, said magnet comprising first and second pole faces disposed on opposite lengthwise sides thereof and having a polarization axis aligned orthogonally with respect to the lengthwise dimension, said first pole face opposing said Hall element and having a non-planar surface contoured to generate a substantially linear orthogonal magnetic field component sensed by said Hall element during linear displacement sensing,
    wherein the surface contour of the first pole face is bounded at the ends of the lengthwise dimension of said magnet by lateral edges, such that the contour of the first pole face is characterized as generally sloping upward from each of the lateral edges and peaking at approximately the midpoint between the lateral edge; and
    wherein the contour of the first pole face slopes upward from each of the lateral edges in a convex manner.

2. The magnetic linear displacement sensor of claim 1, wherein said Hall element and said magnet are mutually disposed in a manner wherein the contoured first pole face of said magnet opposes said Hall element and wherein the sensor plate surface is oriented in parallel with the polarization axis of said magnet.

3. The magnetic linear displacement sensor of claim 1, wherein said at least one magnet is moveable in a linear sensing path with respect to said Hall element, the sensing path being substantially parallel to the lengthwise dimension of said at least one magnet.

4. The magnetic linear displacement sensor of claim 1, wherein said Hall element is coupled to a fixed mounting site.

5. The magnetic linear displacement sensor of claim 4, wherein said at least one magnet is coupled to a linearly moving mounting site to effectuate a relative linear displacement between said Hall element and said at least one magnet.

6. The magnetic linear displacement sensor of claim 1, wherein the sensor plate surface of said Hall element is disposed orthogonally with respect to the lengthwise dimension of said at least one magnet.

7. The magnetic linear displacement sensor of claim 1, wherein said at least one magnet comprises first and second permanent magnets, said first and second permanent magnets mutually disposed such that the contoured first pole faces of said first and second permanent magnets are aligned in mutual opposition to form a sensing corridor therebetween, said Hall element plate disposed within the sensing corridor substantially centered between the contoured first pole faces of said first and second permanent magnets.

8. A magnetic linear displacement sensor comprising:
    a Hall element having a sensor plate surface;
    at least one magnet having a lengthwise dimension along which said Hall element detects a magnetic field component orthogonal to the sensor plate surface during displacement sensing, said magnet comprising first and second pole faces disposed on opposite lengthwise sides thereof and having a polarization axis aligned orthogonally with respect to the lengthwise dimension, said first pole face opposing said Hall element and having a non-planar surface contoured to generate a substantially linear orthogonal magnetic field component sensed by said Hail element during linear displacement sensing; and
    wherein each of said at least one magnet is characterized as having a length of 23.0 mm, a width of 4.0 mm, and a varying height, H, wherein H varies in a symmetrically convex sloping from 4.23 mm at the ends to 5.60 mm at the center.

9. A magnetic linear displacement sensor comprising:

a Hall element having a sensor plate surface;

first and second permanent magnets each having a first pole face disposed on a convex contoured lengthwise side and a second pole face disposed on an opposite lengthwise side thereof, and each having a polarization axis aligned orthogonally with respect to the lengthwise dimension, said first and second permanent magnets mutually disposed such that the contoured first pole faces are aligned in mutual opposition to form a sensing corridor therebetween, said Hall element plate disposed within the sensing corridor substantially centered between the contoured first pole faces; and wherein the surface contour of each of the first pole faces is bounded at the ends of the lengthwise dimension by lateral edges, and wherein the contour of the first pole face is characterized as generally sloping upward from each of the lateral edges and peaking at approximately the midpoint between the lateral edges.

10. The magnetic linear displacement sensor of claim 9, wherein each of said first and second permanent magnets is characterized as having a length of 23.0 mm, a width of 4.0 mm, and a varying height, H, wherein H varies in a symmetrically convex sloping from 4.23 mm at the ends to 5.60 mm at the center.

11. The magnetic linear displacement sensor of claim 9 wherein:

said Hall element and said magnet are mutually disposed in a manner wherein the contoured first pole face of said magnet opposes said Hall element and wherein the sensor plate surface is oriented in parallel with the polarization axis of said magnet; and wherein said at least one magnet is moveable in a linear sensing path with respect to said Hall element, the sensing path being substantially parallel to the lengthwise dimension of said at least one magnet.

12. The magnetic linear displacement sensor of claim 9 wherein:

the surface contour of the first pole face is bounded at the ends of the lengthwise dimension of said magnet by lateral edges, and wherein the contour of the first pole face is characterized as generally sloping upward from each of the lateral edges and peaking at approximately the midpoint between the lateral edges; and the contour of the first pole face slopes upward from each of the lateral edges in a convex manner.

* * * * *

UNITED STATES PATENT AND TRADEMARK OFFICE
CERTIFICATE OF CORRECTION

PATENT NO. : 7,088,095 B1
APPLICATION NO. : 10/772171
DATED : August 8, 2006
INVENTOR(S) : Nicholas F. Busch It is certified that error appears in the above-identified patent and that said Letters Patent is hereby corrected as shown below:

In Column 8, line 63, delete "Hail" and add --Hall--.

Signed and Sealed this

Thirteenth Day of March, 2007

JON W. DUDAS
*Director of the United States Patent and Trademark Office*